Figure 1:
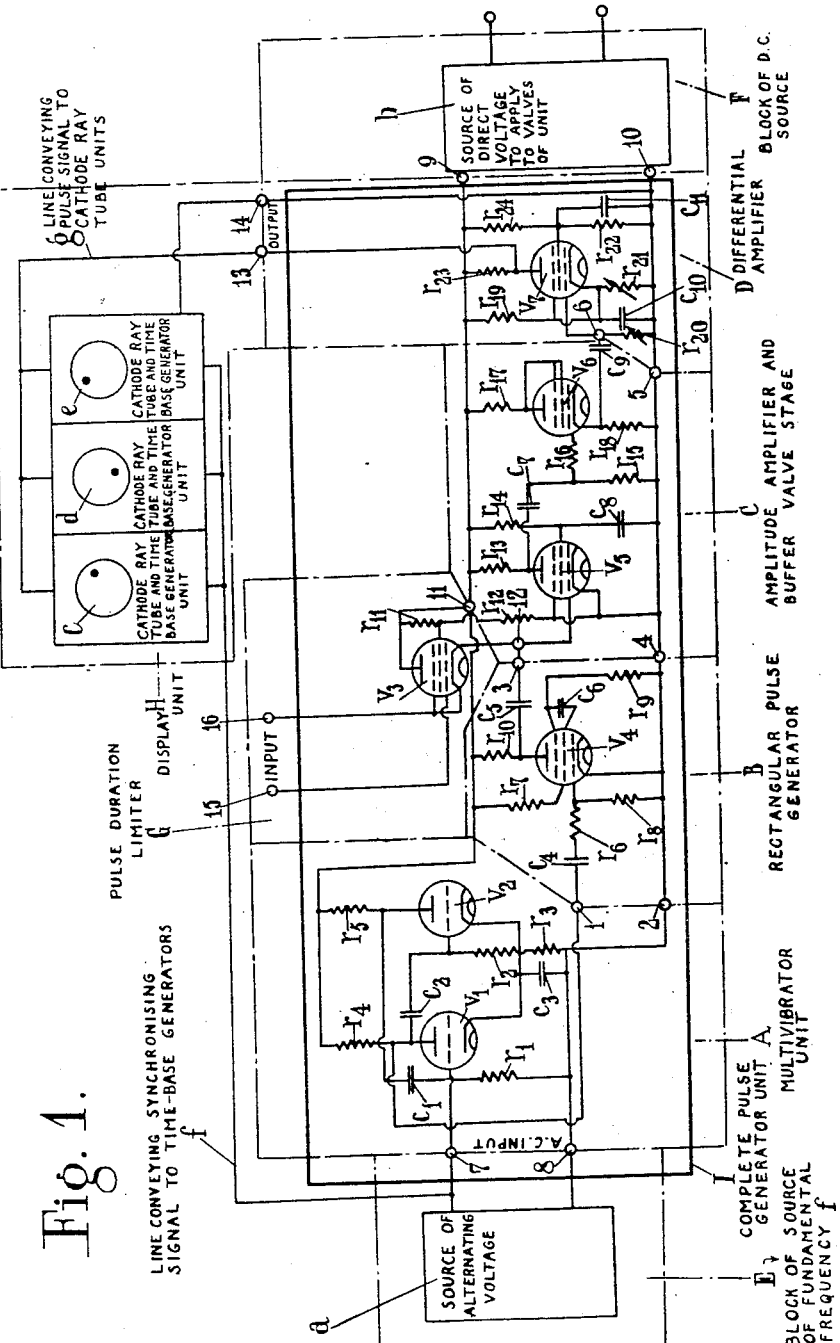

Patented May 1, 1951

2,550,816

UNITED STATES PATENT OFFICE 2,550,816

MEASUREMENT OF ELECTRICAL AMPLITUDES UTILIZING PULSE TIME SHIFTING

Edward Herbert Theobald Jackson, Redhill, England

Application January 12, 1948, Serial No. 1,798
In Great Britain January 14, 1947

1 Claim. (Cl. 171—95)

This invention relates to the indication and measurement of electrical quantities, that is to say, indication of electrical quantities and by calibration of the measuring instrument measurement of the quantities indicated.

The usual electrical measuring instrument has a limited range and if required to measure quantities in excess of this range, either the sensitivity must be reduced to accommodate the larger deflection, or the instrument must be biassed for this purpose. Reducing the sensitivity also reduces the accuracy of indication, and the use of biassing methods is liable to introduce new errors in the measurement.

The object of the invention is to provide an arrangement which affords an extended range of measurement while maintaining the full sensitivity of the system or instrument from which the indication is obtained, that is to say, to afford a large or increased range of measurement without the disadvantages mentioned above, and to maintain the sensitivity of the measuring instrument or system irrespective of how much of the available range is used. In other words the object of the invention is to provide apparatus for the indication of a quantity by an electronic indicator, which may if desired give a considerable number of significant figures and at the same time maintaining the full sensitivity of the system to which the indicator is applied, and also to provide an instrument, which when calibrated is a measuring instrument of great precision measuring the quantity which has been indicated.

The invention consists in apparatus for the measurement of an electrical quantity comprising a multivibrator, a pulse generator, a pulse shifter, a shaping circuit, connections for a source of alternating current of fundamental frequency, connections for a source of direct current, connections for a cathode ray tube, and connections for an input device.

The invention also consists in apparatus and methods for the measurement and indication of electrical quantities, more particularly as pointed out in the claim.

In general terms in one form of the invention the number of cathode ray tubes necessary will equal the number of significant figures to which it is required to measure, and the cathode ray tubes may conveniently be disposed in the manner of the dials of a meter and arranged to read tens, hundreds and fractions as may be required, each tube having the appropriate time base applied thereto.

The cathode ray tubes employed may be of the type giving a line trace which may be measured on a scale, but preferably and in accordance with a further feature of the invention a type of tube giving a circular path of the ray is used, the tubes being provided with a circular calibrated scale for the different significant figures. Thus the tubes may give a circular trace, the measured value being indicated by a pip or deflection which is read off on a concentric scale.

Alternatively the trace may take the form of a radial line, or a spot, which rotates correspondingly with the measured quantity and the position of which may similarly be read on a concentric dial.

The employment of a separate tube for each significant figure is not essential, since it may be possible by the use of electronic switching means or cathode ray tubes of the multiple ray type, or both devices, to obtain readings of two or more figures from a single tube.

The method of the invention in general terms comprises the presentation of the indication by the use of cathode ray tubes which may be arranged in the style of the mechanical dial train applying a suitable time base to each cathode ray beam and using as many beams as significant figures required to be indicated, the spot of the beam moving in any desired manner over the tube screen. The methods suggested are the circular trace "pipped" out at the value which is being indicated, the circular trace being concentric or coincident with a scribed dial of one or more digits; the spot moving to a spiral time base; a radial line rotating until it shows the value to be indicated. In further development by means of electronic switching one cathode ray beam might serve the purpose of some or all the beams now proposed for the indication of the significant figures required.

The way in which the above resultant indication is obtained is the use of amplification or attenuation by means of frequency multiplication or division.

Figure 2:
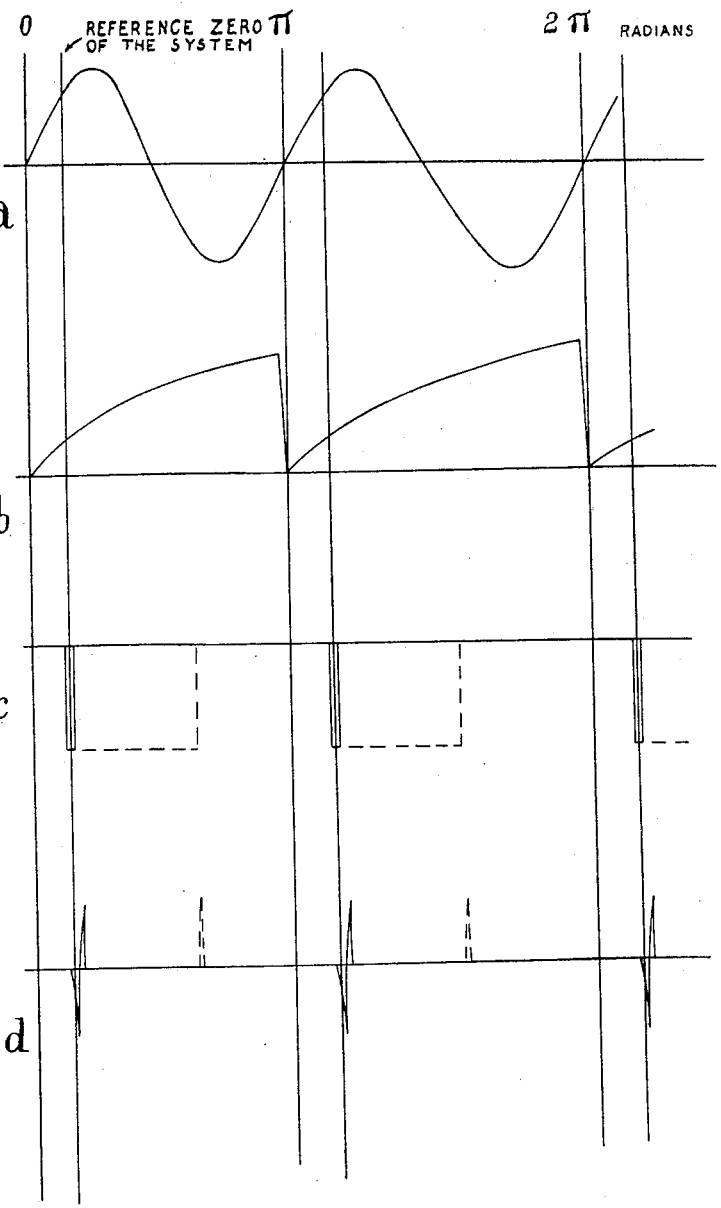

Referring to the accompanying diagrammatic drawings:

Figure 1 represents one arrangement of apparatus and electrical connections according to one form of the present invention;

Figure 2 is a composite drawing comprising four curves or graphs marked respectively Figures 2a, 2b, 2c and 2d illustrating for different times or angles along the horizontal axis on which indications are given of zero $\pi$ and 2 $\pi$ radians, the corresponding magnitudes of electromotive force, 2a illustrating a sine wave or wave formed from a source of alternating voltage; 2b an exponential wave form, 2c a rectangular pulse and 2d an output pulse, all as referred to more particularly below. In the form of the invention illustrated the principal parts or groups constituting the arrangement shown are enclosed in dotted line boundaries in which:

A is a conventional multivibrator unit;
B is a pulse generator;
C is a pulse phase shifter or pulse delay circuit;
D is a conventional shaping circuit;
E is a source of alternating current of desired frequency forming the fundamental frequency of the apparatus;
F is a source of direct current and may be that known as a power pack, or other means for rectifying alternating current or for converting alternating current into direct current;
G is an input circuit and H an output circuit.

The terminals common to circuits A and B, that is the outgoing terminals from circuit A and the incoming terminals to circuit B are marked 1 and 2. The terminals common to circuits B and C are marked 3 and 4. The terminals common to circuits C and D are marked 5 and 6. The terminals common to circuits E and A are marked 7 and 8. The terminals common to circuits F and D are marked 9 and 10. The terminals common to circuits G and C are marked 11 and 12. The terminals common to circuits H and D are marked 13 and 14.

Although it is said that there are terminals common to two circuits they need not be terminals but points on continuous leads.

The input terminals of the set are marked 15 and 16.

Circuit A comprises two triode valves $v_1$ and $v_2$ conventionally represented with associated resistances $r_1$ to $r_5$ and condensers $c_1$ to $c_3$ connected as shown.

The circuit B comprises a pentode valve $v_4$ with associated resistances $r_6$ to $r_{10}$ and condensers $c_4$ to $c_6$ connected as conventionally shown.

The circuit C comprises two pentode valves $v_5$ and $v_6$ with resistances $r_{12}$ to $r_{18}$ and condensers $c_7$ to $c_9$ connected as shown.

The circuit D comprises a pentode valve $v_7$ with fixed resistance $r_{19}$, adjustable resistances $r_{20}$ and $r_{21}$ and fixed resistances 22 to 24 connected as shown as well as condensers $c_{10}$ and $c_{11}$, the connections of which are also illustrated.

In circuit E the source of alternating current supply is indicated by the reference letter $a$.

In the circuit F a power pack has applied thereto the reference letter $b$.

The circuit G comprises a pentode valve $v_3$ and resistance $r_{11}$.

The circuit H comprises three cathode ray tubes marked respectively $c$, $d$ and $e$. A synchronising signal for the time bases of these tubes is supplied from the source of fundamental frequency $a$ by a connection $f$. The pulse signal to the tubes is supplied by a conneciton $g$. The set as a whole is normally that enclosed in the rectangle I, suitable terminals being incorporated for making the necessary outside connections as illustrated in the diagram.

In operation when an alternating waveform of given frequency $f_1$ is fed to the terminals marked "A. C. Input" a pulse of recurrence frequency $f_1$ is obtained at the terminals marked "Output"; the electrical quantity to be indicated, and, therefore, measured when the system has been calibrated, is applied as an E. M. F. to the terminals marked "Input" the effect of any variation in this applied E. M. F. is to change the position or phase of the pulse with respect to the time reference of any cycle of $f_1$ and the circuit may be adjusted so that for zero applied E. M. F. the pulse occurs in each cycle at zero time reference and then for any change from zero in the applied E. M. F. the pulse moves along the time axis of $f_1$. The device may be adjusted so that the pulse is in some other position on the time base and moves in one direction for positive change in applied E. M. F. and in the other direction along the time base for a negative change of the applied E. M. F.; in effect the pulse recurs at every cycle of $f_1$ remaining in a stationary position with reference to the zero time of this frequency so long as the applied E. M. F. to be indicated remains constant in magnitude. This pulse may be presented for indication of the magnitude of the applied E. M. F. by any of the means suggested in the second paragraph above, but the presentation by the circular trace will be considered in detail.

If the first cathode ray beam is being rotated by a circular time base of frequency $f_1$ and the pulse of recurrence rate $f_1$ be applied to the beam by methods (i) to the circular time base then the circular trace on the screen of the cathode ray tube will be "pipped" in or out, according to the polarity, at the point where the pulse occurs with reference to the zero of time of $f_1$ or (ii) to the grid of the cathode ray tube when according to the polarity a dark or bright spot will occur on a circular time trace.

The position of this indication will vary around the circular trace depending on the amount of pulse phase shift from zero reference of time caused by the applied E. M. F. to the pulse phase shifting circuit shown in the attached figure.

If now the cathode ray beam used for the second significant figure of the indication has applied to it a circular time base of frequency ten times $f_1$ then the indication will be ten times as sensitive as that shown on the first beam, that is for a movement of the indication on the first beam of one tenth of a revolution the indication of the second beam will be zero but it will have made one complete revolution of its scale to reach this indication and thus two significant figures have been indicated and further an amplification of ten times has been produced by this means; a third beam may be added running on a circular time base of 100 times $f_1$ or $f_1/10$ whence the indication on this cathode ray beam will be 100 times or $\frac{1}{10}$ of that given by the first beam and three significant figures will be indicated, thus a series of cathode ray beams may be employed each of circular time base frequency ten times greater or less than that of the preceding beam, or $f_1$, to give the required sensitivity and/or significant figures, or of some other multiple if a scale of notation other than ten be required and further in cases of known range of measurement only one beam need be used adjusted to a known circular time base frequency N times greater or less than $f_1$ to give the desired amplification, or attenuation, and indication required of the E. M. F. applied to the "Input" terminals of the pulse shift circuit.

The bright spot method of indication has been favoured in practice since the light emitted by the spot is used to "self-illuminate" the reading of the indication leaving the other markings of the scale more or less obscure; this makes for easy reading of the indicator and has advantages for recording purposes.

Block E, Figure 1, is the source of an alternating voltage, say of the wave-form shown in Figure 2a. The amplitude of this voltage controls the frequency of the multivibrator unit of Block A, Figure 1, containing the valves $v_1$ and $v_2$. This unit in turn generates an exponential waveform, shown in Figure 2b, its frequency controlling the recurrence rate of the rectangular pulse generated by the valve $v_4$ of Block B of Figure 1. The pulse being shown in Figure 2c. The steady flow of current through the valve $v_4$ charges up the condenser $c_5$ of Figure 1 until the potential across it is equal to that initially given its right-hand plate in the diagram by the valve $v_3$ of Block G.

Variation of potential at this point is controlled by the valve $v_3$, the pulse duration limiter, due to the control of its current flow by the magnitude of an E. M. F. applied between its grid and cathode through the input terminals of the unit, Block I. When the potentials across $c_5$ are equalised the rectangular pulse signal developed across $r_{10}$, and fed to the control grid of the amplifying valve $v_5$ of Block C, ceases and the duration of the rectangular pulse is ended. This rectangular pulse is shown in Figure 2c in full line for zero applied E. M. F. to the input terminals 15 and 16 of Figure 1.

The amplified rectangular pulse at the input of $v_5$ is passed on to a differentiating amplifier unit Block D of Figure 1 containing $v_7$ through the buffer valve stage of $v_6$ in Block C. The output pulse from $v_7$ is shown in Figure 2d where it is clear that the time interval between its occurrence and the reference zero of the system is directly dependent upon the magnitude of the E. M. F. applied to the input terminals of the whole unit, Block I, Figure 1.

This pulse is then used to trigger or to deflect the electron beams of a series of cathode ray tubes, such as is shown by the display unit Block H, Figure 1, depending on the type of time-base chosen. The time-base being synchronised by the signal in line $f$ from Block E. If the time-base generator of unit $e$, Figure 1, is of the same frequency as the source $a$, Figure 1, and synchronised to it, the index on the cathode ray tube's screen will take up a steady position the distance of which from the reference zero will depend on the time interval between the occurrence of the pulse from the unit of Block I, Figure 1. The reference zero being a definite point in the waveform of the source $a$ as is shown by the whole of Figure 2. Since this time interval is controlled by the magnitude of the E. M. F. applied to the input terminals of the device the distance between a reference point on the cathode ray tube's screen and the index given by the beam's position will be a measure of the applied E. M. F.

If this same pulse be applied to a similar cathode ray tube and time-base generator unit, as at $d$ in Figure 1, but where the time-base frequency, though synchronised to unit $a$, is $n$ times that of unit $a$, where $n$ is a whole number then the index caused by the electron beam will be displaced from the reference zero by $n$ times the distance as it is simultaneously displayed by the unit $e$, and the sensitivity to a change in magnitude of the E. M. F. applied to the input terminals of Block I, Figure 1, will be $n$ times as great. In this way a decade type of indicating dial train may be assembled where $n$ is made equal to 10 in each successive time-base generator such as contained in the units $c$, $d$ and $e$ of Figure 1, making up the display unit of Block H.

By suitable adjustment of the components of Block I, Figure 1, the distance of the output pulse from the reference zero of the system can be made proportional to the magnitude of the E. M. F. applied to the input terminals of the device and by placing a suitably divided scale adjacent to the indexes of the display unit and calibrating the device as a whole against a standardised source of voltage the instrument is not only an indicating device but an instrument for the measuration of an electrical quantity.

General

The invention may be applied to the measurement of all electrical quantities whatever their magnitude, and in an application to voltage measurement, for example, as many cathode ray tubes are provided as the number of significant figures to be measured. The tubes are preferably those giving a circular trace with a deflection or pip at the indicated position and each is provided with a circular dial concentric with the trace and uniformly graduated from one to ten. The time base of each tube is adjusted to read the required significant figures, the reading on each dial being the lower numbered graduation adjacent the deflection or pip. Thus, for example, for reading up to a thousand volts to four significant figures, four tubes are provided for the hundreds, tens, units, and first decimal place. The time base adjustments are made by any suitable means and the cathode ray tubes operate normally as measuring devices. It will be evident that the kind of graduation employed may be varied as desired.

A further advantage obtained by the use of the invention is that the arrangement cannot be overloaded as is possible with indicating instruments or meters of the usual electro-mechanical type, and the arrangement is also practically unaffected by vibration or centrifugal forces. The invention can, therefore, be used with advantage for measurement in aircraft and under similar conditions, and may also be used to replace the dial trains in fire control gear and for similar purposes.

Although voltage measurement has been referred to in the example given above it will be evident that arrangements according to the invention may be applied to the measurement of other electrical quantities by well-known methods.

The indicator described enables a very large range of magnitude to be covered with a constant sensitivity no matter how much of this range was used, and may be used for the indication of any quantity which can be translated into an electrical quantity, and, of course, of an electrical quantity itself, of almost any magnitude, the maximum sensitivity of the system always being maintained.

Where herein I have referred to "measurement" and "indication" of quantities the terms are to be understood in the following way, that is to say, when the instrument is calibrated, it is a measuring instrument of great precision, the measurement being dependent on the indication.

In the example I have described the employment of two or more cathode ray tubes, namely, three tubes. In fact one tube is sufficient for many applications of the instrument, additional significant figures being obtained from one tube by suitable and selectable time base frequencies.

I claim:

Electronic apparatus for indicating electrical voltages, comprising the combination of a source of alternating current having a predetermined frequency, a multivibrator, operative connections between the source of alternating current and the said vibrator so that the frequency of operation of the said multivibrator is determined by the frequency of the aforesaid source of alternating current; a pulse generator comprising an electronic valve and circuit producing pulses; an electrical connection between the multivibrator and a grid of the aforesaid electronic valve; a second electronic valve and circuit; electrical connections between the two electronic valve circuits for shaping the aforesaid pulses into rectangular form; a third electronic valve and circuit controlling the duration of the rectangular pulses in accordance with the amplitude of the voltage to be measured; means for differentiating these rectangular pulses so that the output from the last circuit is a succession of pulses of short duration still spaced in accordance with the aforesaid amplitude and recurring with the frequency of the aforesaid source of alternating current; connections to a source of direct current for energising the assembly and a cathode ray tube fed from the differentiating circuit on which tube the electrical voltage to be measured is indicated.

EDWARD HERBERT THEOBALD JACKSON.

REFERENCES CITED

The following references are of record in the file of this patent:

UNITED STATES PATENTS

| Number | Name | Date |
|---|---|---|
| 2,178,074 | Jakel et al. | Oct. 31, 1939 |
| 2,422,386 | Anderson | June 17, 1947 |
| 2,428,021 | Grieg | Sept. 30, 1947 |
| 2,439,877 | Stuart | Apr. 20, 1948 |
| 2,470,028 | Gordon | May 10, 1949 |

OTHER REFERENCES

The Wireless Engineer, November 1935, "A Trigger Peak Voltmeter Using Hard Valves," by A. T. Starr, pp. 601–606.